United States Patent [19]

Bradfield et al.

[11] 4,301,980
[45] Nov. 24, 1981

[54] PROPULSION SYSTEM FOR A V/STOL AIRPLANE

[75] Inventors: Ganey W. Bradfield, Fort Worth; Glynn P. Cragin, Jr., Irving, both of Tex.

[73] Assignee: General Dynamics Corporation, Forth Worth, Tex.

[21] Appl. No.: 974,589

[22] Filed: Dec. 29, 1978

[51] Int. Cl.³ .............................................. B64C 29/00
[52] U.S. Cl. .................................. 244/12.5; 244/23 D; 244/55; 244/216
[58] Field of Search ...................... 244/12.5, 23 D, 52, 244/12.1, 13, 15, 55, 207, 216

[56] References Cited

U.S. PATENT DOCUMENTS

| | | | |
|---|---|---|---|
| 2,879,957 | 3/1959 | Lippisch | 244/23 D |
| 3,330,500 | 7/1967 | Winborn | 244/12.5 |
| 3,397,854 | 8/1968 | Reyle | 244/216 X |

FOREIGN PATENT DOCUMENTS 259431  4/1964  Netherlands ...................... 244/12.5

*Primary Examiner*—Charles E. Frankfort
*Attorney, Agent, or Firm*—James E. Bradley; Charles E. Schurman; Robert A. Felsman

[57] ABSTRACT

A propulsion system for an airplane to permit it to achieve vertical and/or short take-offs and landings. The propulsion system is integrated into a wing/nacelle unit and includes a thrust vectoring system. A separate flow turbofan engine is mounted in each wing/nacelle unit. A system of three flaps is located at the rear of each wing/nacelle unit for deflecting the turbofan engine exhaust downward, rearward, or any angle in between. These three flaps are arranged to provide a main thrust nozzle in the horizontal flight position without any additional flaps between them. One flap is located at the wing/nacelle upper surface trailing edge. Two slots are provided at the leading edge of this flap. The upper forward most slot is provided as an exit nozzle for the engine turbine exhaust, which is shrouded from the fan exhaust. The second of these two slots removes a portion of the high energy fan exhaust from the fan discharge duct and ejects it over a flap upper surface. The other two flaps are positioned such that, in the horizontal position they are both aligned with the wing/nacelle lower surface and in the vertical position, one is aligned with the wing/nacelle lower surface and the other is aligned with the wing/nacelle upper surface. When the flaps are in the vertical position, the aft most slot in the upper flap and a slot formed between the upper flap and the lower aft flap provide a means of improving the turning efficiency of the fan exhaust stream.

9 Claims, 9 Drawing Figures

PROPULSION SYSTEM FOR A V/STOL AIRPLANE

BACKGROUND OF THE INVENTION

This invention relates to vertical and/or short takeoff and landing (V/STOL) airplanes and in particular to improved method, system, and apparatus for vectoring the aircraft engine exhaust flow with a system of trailing edge flaps to achieve vertical and/or short takeoffs and landings.

Several types of so called V/STOL aircraft have been proposed. One type, exemplified in U.S. Pat. No. 3,096,954, Bauger et al, uses an articulated cylindrical duct through which a turbofan exhaust is discharged. This type of system has relatively low efficiency due to large losses in turning the exhaust. One loss occurs in the fan exhaust duct on the outside of the turn, where the turning of the exhaust by the nozzle duct wall tends to generate contrarotating vortices. These vortices form a blockage in the duct, causing a thrust loss. Also mixing of the fan exhaust with the hot core or turbine exhaust limits the augmentation ratio available because of a requirement to match the pressures of the two streams.

Another proposal is shown in U.S. Pat. No. 3,330,500 to Winborn. In this propulsive wing type, the fan discharge is vectored through lower surface flaps at approximately the mid cord of the propulsive wing, while the hot turbine exhaust is discharged at the upper trailing edge of the propulsive wing. The discharge of a high energy jet at mid chord on the lower surface of the wing will cause high suckdown forces on the wing and may even be large enough to prevent lift-off.

Another disadvantage of designs such as the Winborn patent referred to above is in the arrangement of the deflecting flaps for the fan exhaust. Several flaps are spaced across the fan nozzle, forming a cascade and vertically dividing the exhaust stream into several layers. The flaps all pivot downwardly, turning the individual layers of air. The several flaps in the mainstream create drag, causing a loss in thrust efficiency. Another disadvantage is that due to their positioning, the total nozzle area varies as the flaps move from the horizontal to downward positions. The variance can detrimentally affect the thrust during transition positions. Another example of this cascade flap arrangement is shown in U.S. Pat. No. 4,000,868, Gregor.

One manner in which certain types of airplanes have improved the lift at low speeds is by bleeding a portion of the jet engine exhaust air or fan air over the upper surface of a wing trailing edge flap. An example of this system is shown in U.S. Pat. No. 3,920,203 to Moorehead. The high energy sheet of air being discharged delays or prevents boundary layer air flow separation. Boundary layer separation as used in this context refers to the separation of an airstream flowing over an airfoil from the airfoil surface. At and after the point of separation, a higher static pressure turbulent area exists between the airstream and airfoil, causing drag and reducing the lifting potential. The high energy sheet of air being ejected over the flap retards or prevents this separation. Also, the jet sheet can induce, by jet pumping action, additional flow over a wing to increase its circulation or lift, this increased circulation being known as super circulation.

Bleeding a portion of the exhaust over a trailing edge flap has been used, with the energy level of the jet sheet at moderate levels, to successfully improve the low speed characteristics of conventional takeoff and landing airplanes, as shown in the Moorehead patent.

One proposal, shown in U.S. Pat. No. 2,879,957, Lippisch, proposes to utilize the propulsion system to create super circulation in a V/STOL airplane. One deficiency in the design disclosed therein is that it is unlikely that the sheet of air could exit through the upper slot since higher pressure air exists on the upper surface of the nacelle. Means would have to be provided to scoop the airflow out. The Lippisch design also utilizes the high drag cascade system of flaps, and has other disadvantages as well.

SUMMARY OF THE INVENTION

It is accordingly a general object of this invention to provide an improved propulsion system for a V/STOL airplane.

It is the further object of this invention to provide an improved propulsion system for a V/STOL airplane that utilizes propulsion induced super circulation to improve the airplane's lifting potential.

It is a further object of this invention to provide a propulsion system for an improved V/STOL airplane that uses a system of flaps to form a large main thrust nozzle for a turbofan engine, free of additional flaps in the fan exhaust mainstream, and with a total nozzle area that remains constant in all positions.

It is the further object of this invention to provide a propulsion system for an improved V/STOL airplane that locates the turbine engine in the nacelle behind the fan so that it is supercharged by that fan, but separates its exhaust from the fan exhaust before reaching the flap nozzle.

In accordance with these objects, a propulsion system for a propulsion induced lift V/STOL airplane is provided that has wing/nacelle units secured to each side of the fuselage. Each wing/nacelle unit contains a turbofan engine positioned ahead of a system of three flaps. An upper flap is positioned at the trailing edge of the wing/nacelle upper surface. Two slots are provided at the leading edge of this flap. The engine turbine discharge has a shroud leading to the most forward slot for separating its hot turbine exhaust from the fan exhaust and discharging it over the flap. The most rearward slot discharges high energy air from the fan exhaust duct over the flap.

A lower flap is mounted to the trailing edge of the wing/nacelle lower surface. An intermediate flap is located behind and in alignment with the lower flap as part of the airfoil lower surface during horizontal flight. All three flaps pivot downwardly to vector the exhaust downward for vertical flight.

The main fan discharge during horizontal flight is through the space between the intermediate flap and the upper flap, this space being free of additional flaps. For vertical flight, the intermediate flap pivots over to a position below the upper flap, forming the trailing edge of the airfoil upper surface. A slot between the upper and intermediate flaps during the vertical flight position bleeds off an additional amount of fan exhaust to improve turning efficiency and to provide additional external boundary layer control.

Accordingly it has been found that more efficient V/STOL aircraft flight can be achieved by providing a nacelle forming an airfoil, with an engine exhaust nozzle formed by a system of trailing edge flaps providing both main and auxiliary exhaust nozzles in which one of the flaps is at the trailing edge of one of the airfoil surfaces (e.g., lower) in one principal flight position (e.g., horizontal) and is repositionable to form the trailing edge of the other (e.g., upper) airfoil surface in the other principal flight position (e.g., vertical) as the exhaust nozzles are directed between horizontal and vertical flight positions. Such flap can thus be shifted between positions in which it may optionally be a part of either the "upper" or "lower" surfaces of the airfoil depending on the direction of nozzle thrust with total nozzle area remaining substantially constant for all nozzle directions, or total nozzle area may be made variable according to predetermined aircraft operating requirements. In horizontal and vertical flight conditions the nozzles can be fully open and unobstructed.

DESCRIPTION OF THE PREFERRED EMBODIMENT

Figure 1:
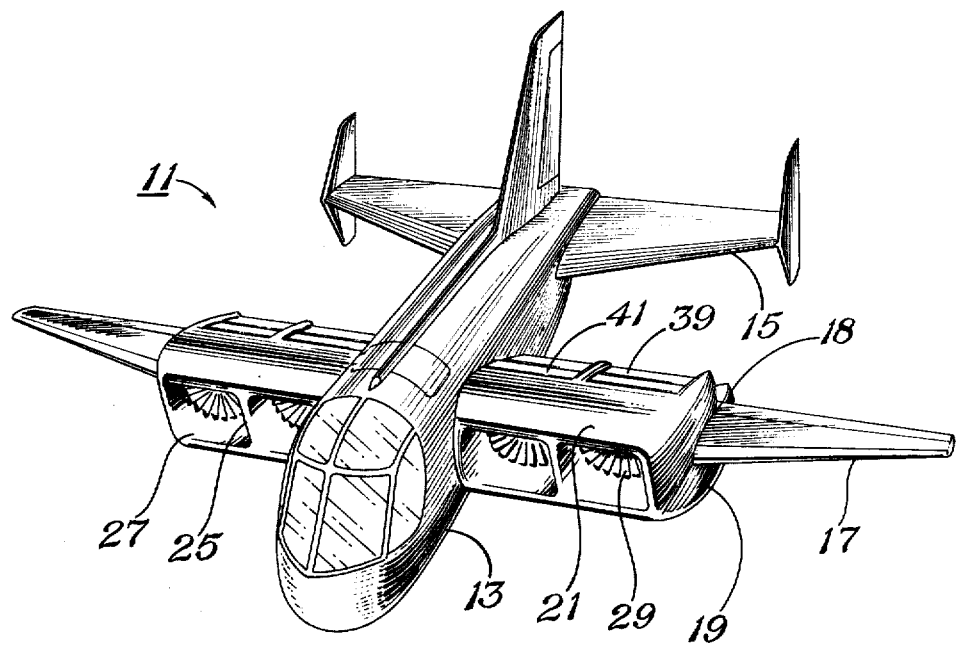
FIG. 1 is a perspective view of an airplane constructed in accordance with this invention.
Figure 2:
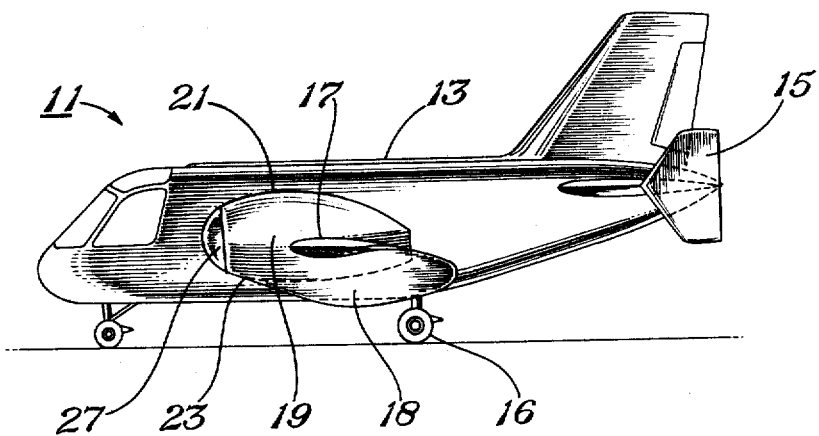
FIG. 2 is a side elevational view of the airplane of FIG. 1.
Figure 3:
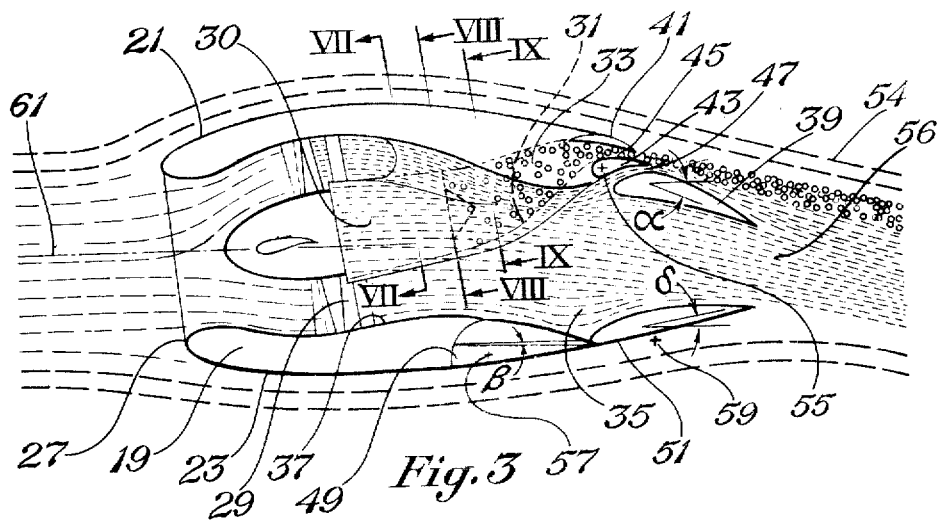
FIG. 3 is a schematic cross-sectional view of the airplane of FIG. 1, taken along the line III—III of FIG. 6, with the propulsion system shown in the horizontal flight mode.
Figure 4:
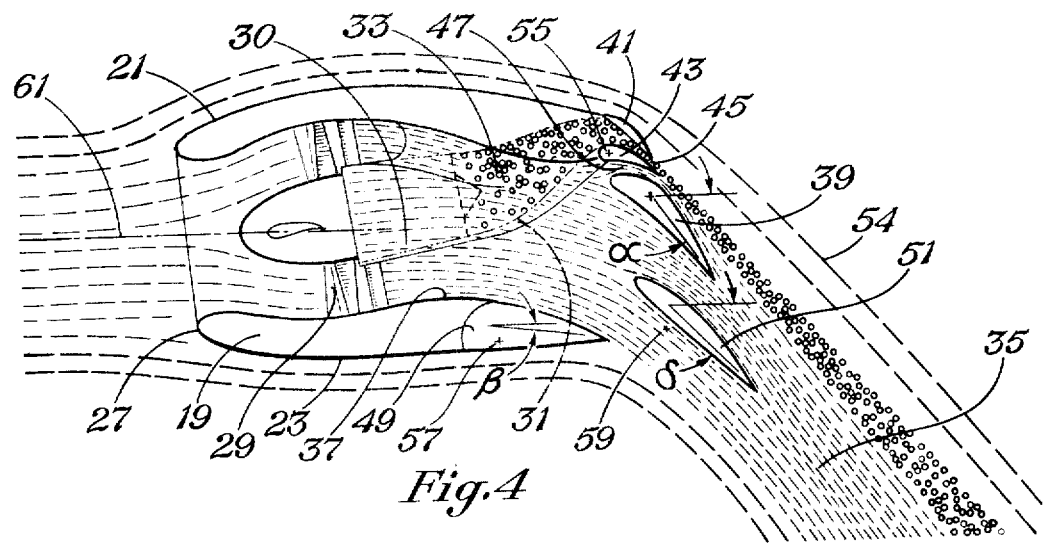
FIG. 4 is a schematic view of the propulsion system, similar to FIG. 3, but showing the propulsion system in a transistional flight mode.
Figure 5:
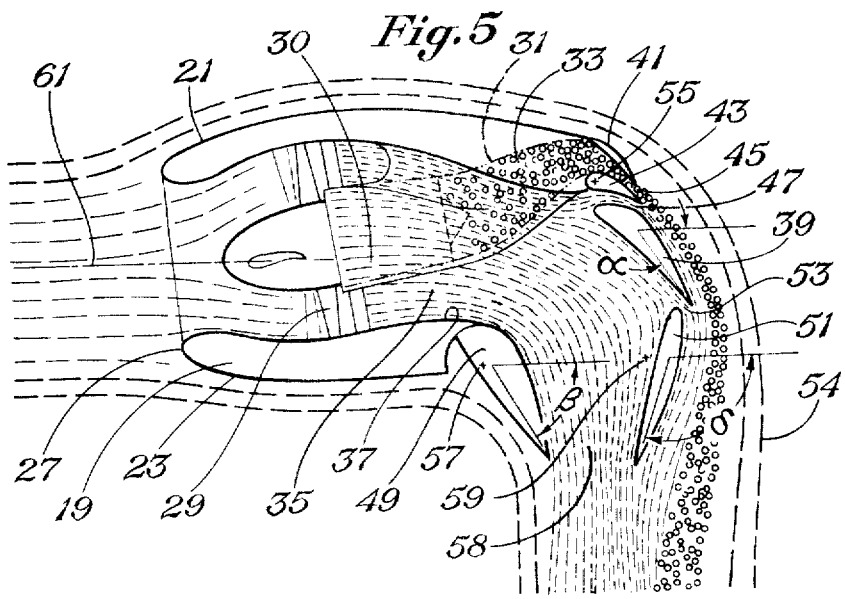
FIG. 5 is a schematic view of the propulsion system, also similar to FIG. 3 to show the propulsion system in the vertical flight mode.
Figure 6:
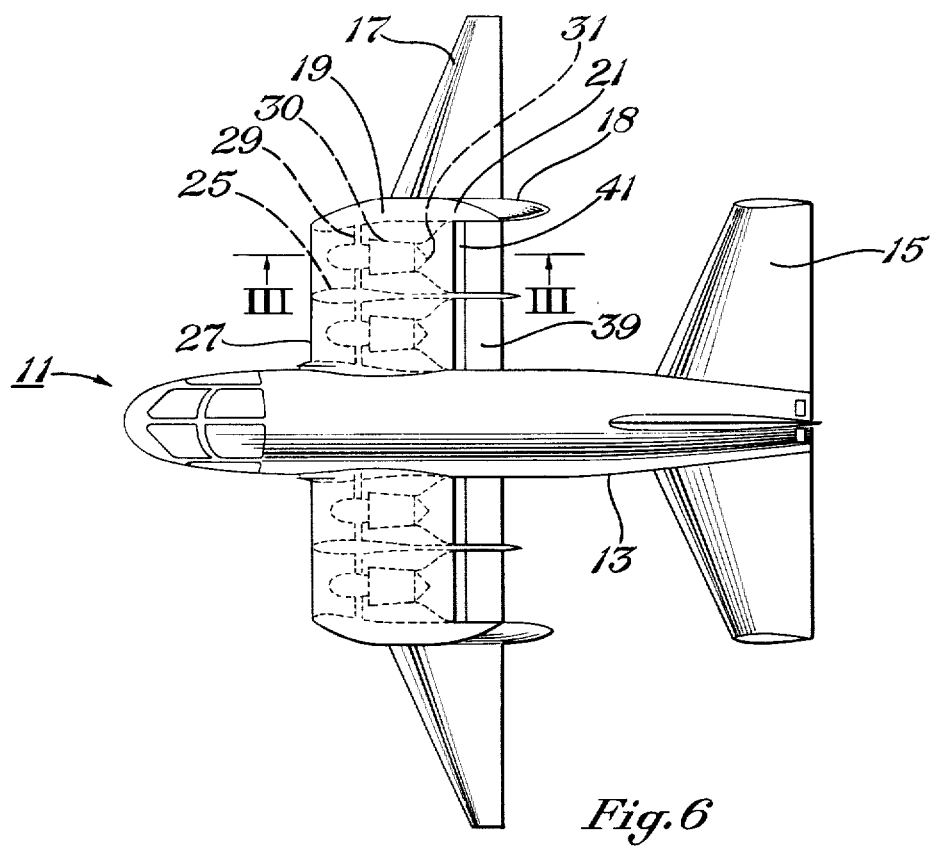
FIG. 6 is a top view of the airplane of FIG. 1.

Airplane 11, shown in FIGS. 1, 2 and 6, has a fuselage 13 and tail section 15 of general configuration common to many types of airplanes. As shown in FIG. 2, the main landing gear 16 folds inside a compartment 18 under each wing 17 during flight. Each wing 17 extends laterally from a pair of wing/nacelles 19 hereafter called nacelles. There are two nacelles, each mounted on a respective opposite side of the fuselage 13. Nacelles 19 have an upper surface 21 and a lower surface 23. These surfaces are curvilinear when viewed in a longitudinal vertical section, as shown in FIGS. 3–5, but generally straight when viewed in a vertical lateral section, as shown partially in FIGS. 7–9. The upper surface 21 and lower surface 23 of each nacelle 19 serve as upper and lower surfaces of a ducted airfoil.

Within each nacelle 19, a vertical partition 25 separates the nacelle into two compartments. Each compartment has a generally rectangular inlet 27. The nacelle outlet or nozzle is also rectangular. The power means for forcing air through nacelle 19 comprises a turbofan engine, having a fan 29 and turbine engine 30 housed in each compartment. Each turbofan engine is a high bypass ratio, low fan pressure ratio engine of generally conventional design. The fan pressure ratio is preferably about 1.2 to 1.8 and the nozzle pressure ratio is approximately the same.

Figure 7:
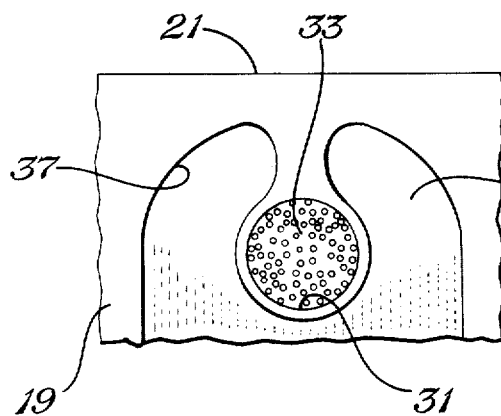
FIG. 7 is a fragmentary and schematic cross-sectional view of the propulsion system of FIG. 3, taken along the line VII—VII of FIG. 3.
Figure 8:
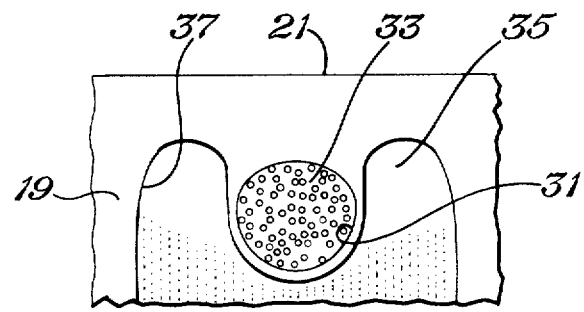
FIG. 8 is a fragmentary and schematic cross-sectional view of the propulsion system of FIG. 3, taken along the line VIII—VIII of FIG. 3.
Figure 9:
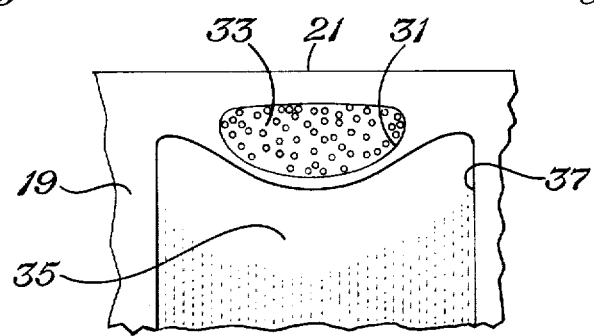
FIG. 9 is a fragmentary schematic cross-sectional view of the propulsion system of FIG. 3, taken along the line IX—IX of FIG. 3.

Referring to FIGS. 3–5 and 7–9, a shroud 31 is attached to the rear of the turbine engine 30 and extends rearward. As shown also in FIG. 6 in phantom, shroud 31 commences at the turbine engine exit as a cylindrical duct, gradually flattening as it proceeds to the rear. At the trailing edge of the nacelle upper surface 21, the passage formed by shroud 31 is in a general rectangular shape of width greater than height. Shroud 31 contains all of the hot exhaust from the turbine engine 30, indicated in FIGS. 3–5 as 33. Exhaust air from the fan 29, indicated in FIGS. 3–5 as 35, passes through the interior 37 of nacelle 19. As shown in FIG. 7, forward of the commencement of shroud 31, the fan exhaust 35 passes around the housing for turbine engine 30, being split at the top by a portion of the housing connected to the nacelle interior surface 37. Further downstream, as shown in FIG. 9, the fan exhaust 35 passes beneath the shroud 31.

Referring to FIGS. 3–5, a plurality of flaps are pivotally secured to the nacelle outlet for vectoring the exhaust between a horizontal flight position and a vertical flight position. An upper flap 39 is mounted adjacent the trailing edge of the nacelle upper surface 21. Flap 39 is pivotal from the position shown in FIG. 3 to that shown in FIG. 5, and is in the shape of an airfoil. Flap 39 includes a pair of vanes 41, 43 rigidly secured to the upper leading edge of flap 39. Vane 41 is considerably shorter in chord length than flap 39 and is sealed against the trailing edge of the nacelle upper surface 21. Vane 41 moves against this trailing edge while pivoting from the position shown in FIG. 3 to that shown in FIG. 5. Vane 43 is mounted between flap 39 and vane 41, and is also considerably shorter in chord length than flap 39. An upper nozzle or slot 45 exists between vanes 41 and 43. An intermediate nozzle or slot 47 exists between vane 43 and flap 39. Vane 41 leads vane 43 slightly, and vane 43 leads flap 39. Shroud 31 terminates at the upper slot 45. Intermediate slot 47 receives a portion of fan exhaust 35, discharging it over the upper surface of flap 39. Engine turbine exhaust 33 is discharged from upper slot 45, also over the upper surface of flap 39. Vanes 41 and 43 should be considered as integral parts of flap 39 and pivot directly with it. Slots 45 and 47 should be considered to be found in the leading edge of upper flap 39. Vanes 41, 43 serve to more efficiently turn a portion of the fan exhaust and engine turbine exhaust as it exits from slots 45 and 47 respectively and flows over the upper surface of flap 39.

A lower flap 49 is pivotally mounted to the nacelle lower surface 23. Flap 49 is in the shape of an airfoil and pivots from the position shown in FIG. 3 to that shown in FIG. 5. An intermediate flap 51 is pivotally mounted to the nacelle 19. Intermediate flap 51 is in the shape of an airfoil and is pivotal from the position shown in FIG. 3 to that shown in FIG. 5. In the position shown in FIG. 5, a lower slot 53 is formed between the leading edge of intermediate flap 51 and the trailing edge of upper flap 39. Fan flow out slot 53 tends to energize the flow over flap 39 and effect efficient flow turning over the external surface of flap 51.

Each compartment within each nacelle 19 has a separate and identical set of flaps. The width of the flaps and the vertical distance across the nacelle outlet are selected to provide a high aspect ratio opening at slots 45 and 47. That is, the width is much greater than the height.

In operation, in the horizontal flight position as shown in FIG. 3, upper flap 39, along with its vanes 41, 43, is generally aligned with the nacelle upper surface 21. That is, flap 39 continues the airfoil upper surface at generally the same rate of curvature as contained on the trailing portion of the nacelle upper surface 21. Upper flap 39 forms the trailing edge of the airfoil upper surface in this position. Hot engine turbine exhaust 33 is ducted through shroud 31 to the upper slot 45. A portion of the fan exhaust is discharged through the intermediate slot 47. The discharges through these slots retard boundary layer separation on the flap external surfaces and increase flow over the wing by jet pumping action, as shown by the longer dashed lines 54 in the drawing. In this position, lower flap 49 and intermediate flap 51 are generally aligned with the nacelle lower surface 23. They continue the airfoil lower surface at generally the same rate of curvature that exists on the trailing portion of the nacelle lower surface 23. Upper flap 39 and intermediate flap 51 define a horizontal flight main thrust nozzle 56 through which the majority of the fan exhaust 35 is discharged. In the horizontal flight position, no additional flaps are located in the horizontal flight main thrust nozzle 56, avoiding unnecessary drag. In the horizontal flight position, the trailing edges of upper flap 39 and intermediate flap 51 are in approximately the same vertical plane. The height of the horizontal flight main thrust nozzle 56 is approximately one-half its width.

FIG. 4 illustrates a transition and STOL position. The pivoting of the flaps from the position shown in FIG. 3 to that shown in FIG. 5 is continuous with no automatic stop, thus the position shown in FIG. 4 is one of an infinite number of transition positions. In the position shown in FIG. 4, upper flap 39 has turned downwardly, turning along with it its vanes 41 and 43, as can be seen as referring to reference pivot point 55. Lower flap 49 has turned downward slightly, although not noticeable by reference to its reference pivot point 57. Intermediate flap 51 has moved away from the lower flap 49 and now splits the majority of the fan exhaust 35 into two separate flow streams, as shown by its reference pivot point 59. Lower flap 49 now becomes the trailing edge of the airfoil lower surface. Both the turbine engine exhaust 33 and fan exhaust 35 incline downward and combine after passing through the flaps.

The vertical flight position, used for vertical takeoff and landing, is shown in FIG. 5. In this position, upper flap 39 and its vanes 41, 43 remain in approximately the same position, as shown in FIG. 4 with only a small amount of additional movement. Lower flap 49 turns downward to a greater degree. Note that the upper surface of lower flap 49 and the lower surface of the nacelle interior 37 form a large radius of curvature to promote turning efficiency. Intermediate flap 51 has pivoted downward further and now has positioned itself to become a part of the airfoil upper surface. Intermediate flap 51 and lower flap 49 define a vertical flight main thrust nozzle 58 that discharges the majority of the fan exhaust 35. All of the engine turbine exhaust 33 continues to discharge through the upper slot 45. A portion of fan exhaust 35 discharges through the intermediate slot 47, and another portion through lower slot 53. Air flowing through these three slots or nozzles helps prevent separation of the stream of air 54 flowing over the airfoil upper surface and induces super circulation or jet pumping of air over the wing. Discharge of a portion of the fan exhaust 35 at the outside of the turn through slots 47 and 53 prevents the internal formation of thrust destroying contrarotating vortices. The thrust potential of the portion of fan exhaust 35 that is bled through slots 47 and 53, and the turbine exhaust 33 through slot 45, is recovered by jet nozzles formed at the slot exits. The flaps are positioned so that the engine turbine exhaust 33 combines with the fan exhaust 35 after exiting through the upper slot 45. In the vertical flight position, the trailing edges of the intermediate flap 51 and lower flap 49 are substantially in the same horizontal plane. The height of the vertical flight main thrust nozzle 58 is approximately one-half its width.

The sum of the areas of slots 45, 47 and horizontal flight main thrust nozzle 56 equals the sum of the areas of slots 45, 47, 53 and vertical flight main thrust nozzle 58. Also, these sums equal all of the sums of the areas of slots 45, 47 and the streams of fan air 35 on both sides of intermediate flap 51 for all transition positions. The total nozzle area normally remains constant through all positions, maintaining a constant power match between fan 29 and turbine engine 30. If desired, the total fan nozzle area can be varied in flight according to a predetermined schedule, however, by independently moving certain of the flaps, as a means for thrust control.

In the preferred embodiment, the engine turbine exhaust 33 will comprise only approximately 13% of the total exhaust flow. About 10% of the fan exhaust 35 is discharged through intermediate slot 47, regardless of the flap positions. In the vertical flight position, an additional portion, approximately 5%, of the fan exhaust 35 is discharged through the lower slot 53.

The degree of pivot of the flaps may be determined with reference to the longitudinal axis 61 of the aircraft. For reference purposes, the angle of inclination of the flaps with respect to the axis 61 is determined herein by drawing a line from the trailing edge of each flap through the approximate center of thickness of each flap. Angle $\alpha$ represents the angle between this center line and the longitudinal axis 61 for upper flap 39. Angle $\beta$ represents the same angle measurement for the lower flap 49, and angle $\delta$ represents the same angle measurement for the intermediate flap 51. In the horizontal flight position, shown in FIG. 3, angle $\alpha$ is approximately negative 23 degrees angle $\beta$ is approximately negative 3 degrees, and angle $\delta$ is approximately positive 8 degrees. In the transition position shown in FIG. 4, angle $\alpha$ has changed to approximately negative 52 degrees, angle $\beta$ to approximately negative 8 degrees, and angle $\delta$ to approximately negative 46 degrees. In the vertical flight position, shown in FIG. 5, angle $\alpha$ is approximately negative 60 degrees, angle $\beta$ is approximately negative 63 degrees, and angle $\delta$ is approximately 110 degrees. Consequently, between the horizontal and vertical flight positions, the upper flap 39 pivots a total of approximately 37 degrees, the lower flap 49 pivots a total of approximately 60 degrees and the intermediate flap 51 pivots a total of approximately 118 degrees.

It should be apparent that an invention having significant improvements has been provided. The propulsion system with its system of flaps permits design of a highly efficient vertical and short takeoff and landing airplane. The discharge of high energy air over the upper surface flaps retards boundary layer separation and induces super circulation around the airfoil. The flaps are located so that during horizontal flight and in vertical flight, the main thrust nozzles 56 and 58 are free of drag creating intermediate flaps. The slots 47 and 53 provided in the vertical flight position bleed off internal vortices formed by the fan exhaust air stream being turned by the internal nozzle wall, making turning of the exhaust highly efficient.

Separating the engine turbine exhaust from the fan exhaust promotes higher propulsion system augmentation ratio by avoiding the interaction of two streams of different pressures.

While the invention has been shown in only one of its forms, it should be apparent to those skilled in the art that it is not so limited but is susceptible to various changes and modifications without departing from the spirit thereof.

We claim:

1. A propulsion system for a vertical and short takeoff and landing airplane, comprising:
    a nacelle having an upper surface and a lower surface forming an upper surface and a lower surface of an airfoil respectively;
    turbine driven fan means for forcing air through the nacelle;
    an upper flap located near the trailing edge of the nacelle upper surface and forming a part of the airfoil upper surface, the upper flap being pivotal from a horizontal flight position generally aligned with the nacelle upper surface to a vertical flight position pointing generally downward;
    a lower flap adjacent the trailing edge of the nacelle lower surface and forming a part of the airfoil lower surface, the lower flap being pivotal from a horizontal flight position generally aligned with the nacelle lower surface to a vertical flight position pointing generally downward; and
    an intermediate flap secured to the nacelle and pivotal between a horizontal flight position in which the intermediate flap is rearward of the lower flap, generally aligned with the nacelle lower surface and forming a part of the airfoil lower surface and a vertical flight position in which the leading edge of the intermediate flap is adjacent the trailing edge of the upper flap and in which the intermediate flap points generally downward, becoming the trailing edge of the airfoil upper surface;
    in the horizontal flight position, the space between the upper flap and the intermediate flap defining a horizontal flight main thrust nozzle; and
    in the vertical flight position, the space between the lower flap and intermediate flap defining a vertical flight main thrust nozzle.

2. The propulsion system according to claim 1 wherein the upper flap is positioned from the trailing edge of the nacelle upper surface a selected distance so that a portion of the fan means exhaust flows over the upper flap.

3. The propulsion system according to claim 1, wherein a slot is located between the leading edge of the upper flap and the nacelle upper surface, wherein the turbine driven fan means comprises a fan and a turbine engine in the nacelle, and further comprising a shroud extending from the rear of the turbine engine to the slot for separating turbine engine exhaust from fan exhaust upstream of the slot.

4. The propulsion system according to claim 1 wherein the upper flap has a pair of vanes secured to the upper flap in a space between the upper flap and the nacelle upper surface, one above the other, the vanes being spaced apart from each other and from the upper surface of the upper flap, defining an upper slot and an intermediate slot and wherein the turbine driven fan means comprises a fan and a turbine engine in the nacelle, and further comprising a shroud extending from the rear of the turbine engine and terminating at the upper slot for discharging the engine turbine exhaust, the intermediate slot discharging a portion of the fan exhaust.

5. The propulsion system according to claim 1 wherein in the vertical flight position, the leading edge of the intermediate flap is separated from the trailing edge of the upper flap by a selected distance for creating a slot to discharge a portion of the fan means exhaust to improve turning efficiency.

6. A propulsion system for a vertical and short takeoff and landing airplane, comprising;
    a nacelle having an upper surface and a lower surface forming an upper surface and a lower surface of an airfoil, respectively;
    the nacelle having a generally rectangular inlet and outlet;
    a turbofan engine, including a fan and a turbine engine, both mounted in the nacelle;
    an upper flap pivotally secured adjacent the trailing edge of the nacelle and forming a part of the airfoil upper surface, the upper flap having a pair of vanes secured between the upper surface of the upper flap and the trailing edge of the nacelle upper surface; the vanes being secured to the upper flap and pivotal with the upper flap, the vanes being spaced vertically apart from each other and vertically from the upper surface of the upper flap, defining an upper slot and an intermediate slot, the intermediate slot discharging a portion of the fan exhaust, the upper flap being pivotal between a horizontal flight position generally aligned with the nacelle upper surface, and a vertical flight position pointing generally downward for vectoring fan and engine exhaust downward;
    a shroud extending from the rear of the turbine engine to the upper slot for discharging the engine exhaust separate from the fan exhaust;
    a lower flap pivotally secured to the nacelle lower surface and forming a part of the airfoil lower surface, the lower flap being pivotal between a horizontal flight position generally aligned with the nacelle lower surface and a vertical flight position, pointing generally downward to vector the fan exhaust downward; and
    an intermediate flap pivotally secured to the nacelle and pivotal between a horizontal flight position to the rear of the lower flap and forming a part of the airfoil lower surface, and a vertical flight position below the upper flap, pointing generally downward and forming a part of the airfoil upper surface; in the vertical flight position, the upper flap and intermediate flap being positioned with a lower slot between their trailing and leading edges, respectively, for discharging a portion of the fan exhaust;
    in the horizontal flight position, the upper and intermediate flaps defining a horizontal flight main thrust nozzle;
    in the vertical flight position, the lower and intermediate flaps defining a vertical flight main thrust nozzle;

normally, the sum of the areas of the upper slot, intermediate slot, and horizontal flight main thrust nozzle being substantially equal to the sum of the areas of the upper slot, intermediate slot, lower slot and vertical flight main thrust nozzle, and also equal to the sum of the areas of all the slots and the spaces between the flaps in all transition positions, and the flaps also may be actuated such that the sum of the areas of the slots and the nozzles vary according to a predetermined schedule in any flight position from horizontal to vertical.

7. The propulsion system according to claim 6 wherein in the horizontal flight position, substantially 10 percent of the fan exhaust is discharged through the intermediate slot, the remainder being discharged through the horizontal flight main thrust nozzle.

8. The propulsion system according to claim 6 wherein in the vertical flight position, substantially 10 percent of the fan exhaust is discharged through the intermediate slot, and substantially 5 percent of the fan exhaust is discharged through the lower slot, with the remainder being discharged through the vertical flight main thrust nozzle.

9. The propulsion system according to claim 6 wherein between the horizontal and vertical flight positions, a centerline drawn through the upper flap pivots substantially from a negative angle of 23 degrees to a negative angle of 60 degrees, and wherein a centerline through the lower flap pivots substantially from an angle of negative 3 degrees to negative 63 degrees, and wherein a centerline through the intermediate flap pivots substantially from an angle of positive 8 degrees to negative 110 degrees, all with respect to the longitudinal axis of the airplane.

* * * * *